Jan. 16, 1934.   C. T. JOHNSON   1,943,386
INFUSION DEVICE
Filed June 1, 1931   2 Sheets-Sheet 2

INVENTOR
Claude T. Johnson
BY Henry Lanahan
ATTORNEY

UNITED STATES PATENT OFFICE 1,943,386

INFUSION DEVICE

Claude T. Johnson, East Orange, N. J., assignor to Thomas A. Edison, Incorporated, West Orange, N. J., a corporation of New Jersey Application June 1, 1931. Serial No. 541,201

19 Claims. (Cl. 219—43)

The present invention relates to improvements in infusion devices and more particularly to an improved structure adapted to facilitate the circulation of a liquid in such a device, and also to an improved construction and arrangement of heat conducting means adapted to be employed therein. While my invention in its preferred form, is embodied in an infusion device adapted to be heated by electricity, it will be obvious that many of the features of my invention are also applicable to infusion devices which are otherwise heated.

In certain aspects the present invention is an improvement over that disclosed and claimed in the pending application of Charles A. Schallis, Serial No. 473,223, filed August 5, 1930, and entitled Infusion devices and the like.

One object of my invention is to provide an infusion device which is of simplified and inexpensive construction and which is capable of effectively extracting the essence from coffee or other material.

Another object of my invention is to provide an improved siphon structure adapted to effect the transfer of liquid from one point in an infusion device to another.

Another object of my invention is to provide an infusion device of improved construction, wherein the container for the liquid coffee or the like resulting from the operation of the device, is disposed within a water container, and wherein improved means is provided for conveying the water and the liquid coffee or the like to respective outlets.

Another object of my invention is to provide improved means for more effectively conducting heat from parts of the infusion device directly surrounding the heating unit, to an automatic safety device, to insure the prompt operation of the latter as soon as but not before the temperature of such parts reaches a predetermined danger point.

Additional objects and features of my invention will be obvious upon an understanding of the construction about to be described, or will be pointed out in the appended claims, and various advantages not specifically referred to herein will occur to those skilled in the art upon the employment of my invention in practice.

In order that my invention may be more clearly understood, a preferred embodiment has been chosen for purposes of illustration and description and is shown in the drawings accompanying and forming a part of this specification, wherein.

Figure 1:
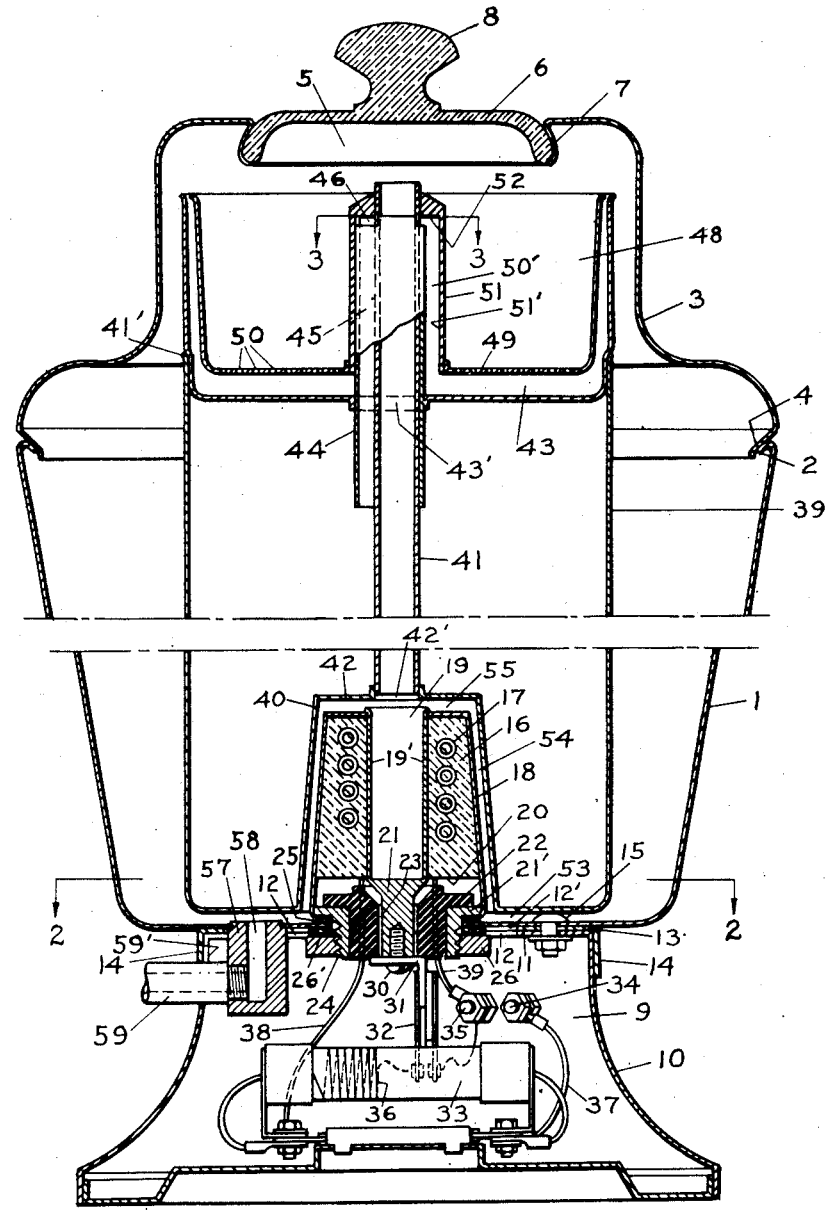
Figure 1 is a vertical, cross sectional view of an infusion device embodying my invention, certain parts being shown in elevation.
Figure 2:
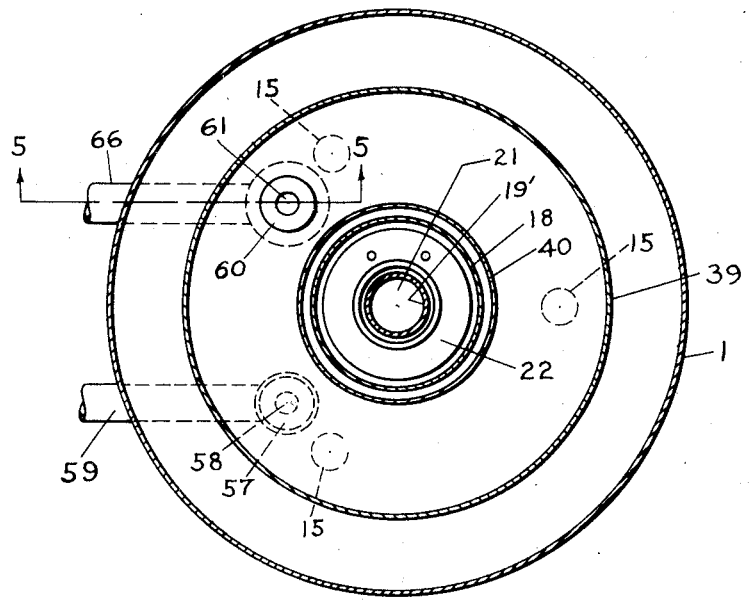
Fig. 2 is a horizontal, cross sectional view taken on line 2—2 of Fig. 1.

Referring to the drawings, numeral 1 represents a hollow body, circular in horizontal cross section and formed of light sheet metal, which serves as a water container or tank. The upper peripheral portion of body 1 is turned inwardly to form the shoulder 2 which serves as a support for a domed top 3, the latter preferably being shaped, as shown in Fig. 1, and also being formed of light sheet metal. The lower peripheral portion of the top 3 is also turned inwardly to form a shoulder 4 which cooperates with the shoulder 2 to provide a substantially vapor proof seal between the body 1 and said top when the latter is positioned, as shown in Fig. 1.

The upper end of the domed top 3 has a central circular opening 5, the peripheral edge portion 7 of which is bent inwardly, as shown in Fig. 1, and closely embraces a glass insert 6 so as to securely hold the same in the position shown. The insert 6 has a knob 8 which serves as a handle for removing the top 3 from the body 1.

The body 1 is supported on a hollow base 9 which is formed of light sheet metal, is circular in cross section and is provided with an upper reduced section 10 and a flat horizontal top 11. The top 11 is provided with a large and centrally located circular opening 12. A member 13 formed of light sheet metal is disposed between the top 11 and the bottom of body 1 and is provided with a peripheral flange 14 which is frictionally engaged over the upper end portion of base 9. Member 13 also has a centrally located circular opening 12' which is concentric with and of substantially the same diameter as the opening 12. The bottom of body 1 is also provided with a similarly located circular opening which, however, is considerably less in diameter than openings 12 and 12'. The structure just described is held in the assembled position shown by means of bolts 15, the rounded heads of which extend above the bottom of the body 1 and are brazed to the latter to form water-tight joints therewith. The rounded heads of bolts 15 also serve to support and space a tank, which will hereinafter be described, from the bottom of body 1.

A suitable electric heating unit 16 comprising a resistance coil 17, is enclosed in a metallic casing 18. The casing 18 is provided with a thermal cylindrical well 19 which is surrounded by the coil 17 and which extends through and slightly below the bottom 20 of the casing. The outer wall of casing 18 extends a considerable distance below the bottom thereof and the lower end of well 19. The upper peripheral portion of a thermal plug 21, formed of suitable heat conducting metal, is secured, as by brazing, to the lower peripheral portion of the wall 19' of the well to form a water-tight joint, the upper surface of the plug thus forming the bottom of the well. If desired, the wall 19' of well 19 may be formed integrally with thermal plug 21, as by drilling a recess in one end portion of a single piece of material to provide the well and forming the other end portion of said piece into the plug. However, for reasons of economy, I prefer to proceed as first described.

A flanged bushing 21' supports a flanged cylindrical member or block 22 of refractory insulating material in the position shown in Fig. 1, the flange of the bushing being embraced by the lower end of the outer wall of casing 18 and being brazed or otherwise secured thereto to provide a water-tight joint. Member 22 is provided with a longitudinal opening 23 through which the plug 21 extends, the lower ends of said member and plug being substantially flush.

The flange of bushing 21' overlies the portion of the bottom of body 1 which is adjacent the central circular opening therein, and the threaded shank 24 of the bushing extends through said opening and the openings 12' and 12 in member 13 and in the top 11 of base 9 and into the upper section 10 of said base. A nut 26 is threaded onto the shank 24 and is turned up tightly to thereby firmly and removably secure the heating unit 16 in the position shown in Fig. 1. Suitable packing rings or washers 25 and 26' are respectively disposed between the flange of bushing 21' and the bottom of body 1 and between nut 26 and said bottom, and accordingly a liquid-tight joint will be formed between said bushing and the body 1 when the nut is tightened.

One of the features of my invention resides in the intimate thermal relationship established in the construction described, between the plug 21 and heating unit 16, which is largely due to the fact that the top of the plug constitutes the bottom of the thermal well 19. With this construction it is obvious that as long as there is water in the thermal well, the temperature of the active surfaces of the heating until will not reach the predetermined danger point (about 260° F.) for when the device is in operation the water does not rise to a temperature above or greatly above 212° F. and the thermal plug is maintained at approximately the same temperature as the water. If for any reason, however, while current is being supplied to the coil 17 of the heating unit, there should be no water in the thermal well 19, the temperature of the walls of the well would quickly rise, as would also the temperature of the thermal plug 21. The plug 21 is secured to and in intimate thermal relationship with an angular member 31, as by a screw 30, and said member 31, in turn, is secured to and in intimate thermal relationship with the bi-metallic member 32 of a suitable known form of automatic cut-out device 33. This cut-out device is so designed that when the temperature of the bi-metallic member 32 reaches a predetermined upper limit, such member will be deflected and close a switch so that current which is ordinarily supplied to the heating coil 17 of the diffusion device through terminals 34 and 35 and conductors 37, 38 and 39, will be shunted through the coil 36 of said cut-out device. Thereupon the current which passes through the heating coil 17 will be insufficient to appreciably heat the same and the temperature of the heating unit 16 and the adjacent structure, including member 32, will fall below the danger point. When the temperature of the bi-metallic member 32 falls substantially to a given point, such member will act automatically to open the shunt circuit and current will then again be effective to heat the coil 17. It is obvious that, if desired, an ordinary fusible link can be used in place of the automatic cut-out device 33. I prefer, however, to employ the cut-out device shown as it does not ordinarily require replacement but acts automatically to maintain the temperature of the heating unit within desired limits. I make no claim per se, either to the structure of the cut-out device or to the structure hereinbefore described for removably securing the heating unit in place.

A tank 39, which is circular in horizontal cross section and formed of light sheet metal, is disposed within the body 1 with its bottom spaced from the bottom of said body by the heads of bolts 15. The bottom of the tank 39 is provided with a reentrant portion 40 which accommodates the heating unit 16, the arrangement being such that when the tank is positioned, as shown in Fig. 1, there will be a slight clearance between the inner surfaces of said reentrant portion and the corresponding adjacent outer surfaces of the heating unit casing 18, the purpose of which will be presently explained.

The top 42 of the reentrant portion 40 has a central circular opening 42' which is slightly less in diameter than the thermal well 19 and which is positioned directly above and is concentric with the well when the parts are in assembled position, as shown in Fig. 1. A metal tube 41 has a rigid water-tight connection with the top 42 about the opening 42' and extends therefrom to a point which is well above the upper end of the tank 39 and a short distance below the bottom of the glass insert 6 in the top 3.

Figure 3:
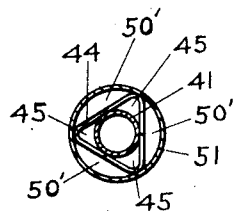
Fig. 3 is a horizontal, cross sectional view taken on line 3—3 of Fig. 1.
Figure 4:
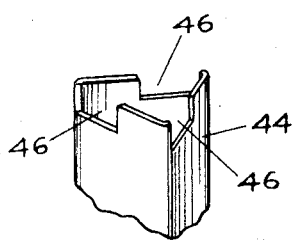
Fig. 4 is a perspective view of the upper portion of one of the siphon elements.

A receptacle 43 formed of light sheet metal and circular in horizontal cross section, is supported by a shoulder 41' formed thereon cooperating with the upper end of the tank 39, the lower end portion of said receptacle being telescoped within the tank 39, as clearly shown in Fig. 1. The bottom of receptacle 43 is provided with a centrally located flanged opening 43' which is preferably in the form of an equilateral triangle. A tube 44 formed of sheet metal and having a horizontal cross section similar in configuration to the opening 43', extends through the latter to points which are respectively considerable distances above and below the bottom of the receptacle 43, the tube being secured, as by brazing, to the flange about said opening in liquid-tight relation thereto. The positions and dimensions of tubes 41 and 44 are such that when the receptacle 43 is positioned atop tank 39, the cylindrical tube 41 extends through and above the upper end of tube 44 and the sides of the latter are respectively tangent to the outer surface of tube 41, as clearly shown in Fig. 3, whereby the three passageways or channels 45 are formed. The upper end of tube 44 is located somewhat below the upper end of tube 41 and the latter extends slightly above the upper edge of the receptacle 43, as shown in Fig. 1. The upper end of each of the sides of tube 44 is notched at 46, as shown in Figs. 1 and 4, for a purpose which will presently be apparent.

A basket 48 formed of light sheet metal and circular in horizontal section, has a bottom 49 which is provided with a great number of very small perforations, as indicated at 50 (Fig. 1). This basket is provided with a vertical centrally positioned hollow cylindrical member 51 which is secured at its lower open end to the bottom 49 about an opening in the latter. The bore 51' of member 51 is such that the vertices of the external dihedral angles formed by the sides of tube 44 respectively engage the interior surface of the member 51 when the basket 48 is in the position shown in Fig. 1, thereby forming a plurality of passageways or channels 50' which respectively communicate with said channels 45 through the notches 46 in the upper end portion of tube 44. The diameter of the bore 51' is abruptly reduced adjacent the upper end of member 51 to form a shoulder 52 which is adapted to engage the upper end of tube 44 to thereby support basket 48 with its perforated bottom 49 slightly spaced from the bottom of the receptacle 43. The tube 41 extends with a fairly close fit through the reduced portion of the bore 51' and slightly above the top of member 51. The upper end portion of the basket 48 is slightly flared outwardly so as to extend almost but not quite into engagement with the upper edge of the receptacle 43, the purpose of which is to prevent water from falling or splashing directly into said receptacle without passing through the basket.

From the foregoing description it is apparent that if water is introduced into the body 1 until it reaches a level above the top of well 19, it will enter and fill the well by flowing through the narrow channels 53, 54 and 55 formed between the tank 39 and the bottom of body 1 and casing 18 of the heating unit. The water, however, cannot enter the interior of the heating unit casing 18. If terminals 34 and 35 are then connected to a suitable source of electric energy the coil 17 and heating unit becomes heated. The heat produced in unit 16 will be largely absorbed by the water in the thermal well 19 and in said channels 53, 54 and 55. The limited volume of water in well 19 will therefore quickly reach the ebullition point and thereupon will be forcibly ejected from the well through the opening in tube 41, which, being unrestricted and directly in line with the well, offers the path of least resistance. After such expulsion of the heated water through the tube 41, cooler water will flow through channels 53, 54 and 55 into the well 19. The actions just described will be repeated at short intervals until the water in the body 1 is lowered to the level of the top of the well.

The heated water intermittently ejected from well 19, as described, is expelled from the upper end of tube 41 against glass insert 6 from which it is distributed over the ground coffee or such other comminuted or granular material as may have been placed in the basket 48. Infusion then takes place between the material in the basket and the heated water, and the resulting liquid coffee or the like gradually passes through the small perforations 50 into the space between the bottom of the basket and the bottom of receptacle 43. Minute particles of material which may be carried through the perforations 50 will be mostly deposited and retained on the bottom of the receptacle. The liquid coffee or the like gradually rises in the receptacle 43 and the channels 50' until it reaches the level of the lower edges of the notches 46 and then flows through the latter and the channels 45 into the tank 39 where it is retained until drawn off.

Each of the channels 50' constitutes one leg of a siphon, the other leg of which is formed by the corresponding channel 45. Accordingly, once the flow of liquid through the channels 45 has commenced, it continues until the level of the liquid in the receptacle 43 reaches the level of the lower ends of the legs 50' of the siphons. Thus substantially all of the liquid coffee or the like produced, will be intermittently siphoned from the receptacle 43 to the tank 39 in a clear condition, leaving only fine sediment in the bottom of said receptacle.

To permit the convenient drawing of hot water from body 1 for dilution of the liquid coffee or the like, or for other purposes, the upper end of a cylindrical member 57 is swedged, or otherwise firmly secured with a liquid-tight joint to the bottom of the said body. The member 57 extends through suitable openings or cut-outs provided in the member 13 and the top 11 of base 9, and is provided with a longitudinally extending opening 58 communicating at its upper end with the interior of body 1 and at its lower end with a tube 59 which is threaded into said member 57 and extends therefrom through suitable slots or cutouts 59' in the base 9 and in the flange 14 of member 13. The outer end of tube 59 may be connected to a suitable spigot (not shown).

Figure 5:
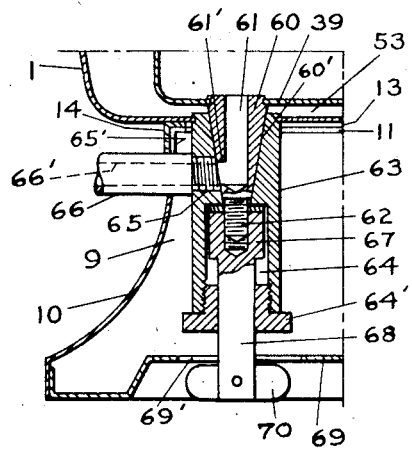
Fig. 5 is a vertical, sectional view on line 5—5 of Fig. 2.

Another feature of my invention resides in the manner in which the tank 39 is removably secured in respect to the body 1, and with the walls of the reentrant portion 40 in spaced relationship to the side and top walls of the heating unit casing 18. Certain parts of the securing means, about to be described, also provide a passageway through which liquid coffee or the like may be drawn from said tank. Referring particularly to Fig. 5, numeral 60 represents a frustro-conical shaped plug having a longitudinally extending passageway 61 connected with a laterally extending passageway 61'. A threaded elongation 62 is formed integrally with and extends from the smaller end of the plugs. The larger end of plug 60 is swedged over and brazed to the bottom of tank 39 about an opening therein so that the passageway 61 communicates at its upper end with the interior of the tank. The plug extends from tank 39 through the space 53 between the bottoms of the tank and the body 1 and into a member 63 which is swedged and brazed to the bottom of body 1 about an opening therein and which extends downwardly therefrom through suitable openings provided in the member 13 and the top 11 of base 9. The upper end portion of member 63 is provided with a longitudinally extending frustro-conical shaped opening 60' into which the plug 60 fits snugly with its elongation 62 extending into a large longitudinal cylindrical recess or opening 64 formed in the lower end portion of member 63. Member 63 is also provided with a transversely extending threaded opening 65 which connects with the opening 60' and is so located as to be in alignment with the passageway 61' of plug 60 when the latter is positioned in the opening 60'. One end of a tube 66 is tightly threaded into the opening 65 whereby the bore 66' of the tube is brought into communication with the opening 61' in the plug. A nut 67 is threaded onto the elongation 62 of plug 60 and is provided with a long shank 68 which extends from member 63 through the opening 64 and a bushing 64' threaded into the outer end of the latter and down through a slot 69' in the bottom plate 69 of base 9. The shank 68 is provided at a point below the base plate 69 with a wing 70 to facilitate the turning of nut 67. The nut 67 is turned up on the elongation 62 of plug 60 into tight engagement with the bottom of the recess or opening 64 in member 63. It is obvious that upon tightening the nut 67 plug 60 will be forced into intimate and water-tight engagement with the wall of opening 60'. The tube 66 extends from the member 63 through suitable slots or cutouts 65' provided in the base 9 and the flange 14 of member 13. The usual spigot (not shown) may be attached to the outer end of tube 66 to control the drawing of the liquid coffee or the like therethrough from tank 39. The construction just described, in addition to other advantages, permits the easy removal and replacement of the tank 39 in respect to the body 1, so that both the tank and body can be easily inspected and cleaned. It is to be noted that the rounded head of one of the bolts 15 serves to support tank 39 from the bottom of body 1 at a point closely adjacent plug 60, whereby buckling of and undue strain on the bottom of the tank will be prevented when the nut 67 is tightened.

As various changes may be made in the form, construction and arrangement of parts in the preferred embodiment herein shown and described without departing from the spirit and scope of the invention and without sacrificing its advantages, it is to be understood that all matter herein is to be interpreted as illustrative and not in a limiting sense.

Having thus described my invention, what I claim as new and desire to secure by Letters Patent, is as follows:

1. In a device of the class described, in combination, a tank adapted to contain a liquid, a second tank disposed within said first named tank with its bottom in spaced relationship to the bottom of said first tank and having a reentrant portion, and a heating unit mounted in association with one of said tanks, said heating unit comprising a portion disposed within said reentrant portion.

2. In a device of the class described, in combination, a tank adapted to contain a liquid, a second tank mounted within said first named tank and with its bottom in spaced relation to the bottom of the latter, and a heating unit intimately associated with both of said tanks.

3. In a device of the class described, in combination, a tank adapted to contain a liquid, a second tank mounted within and with its bottom in spaced relation to said first named tank and having a reentrant portion, and a heating unit having an outer casing and thermally associated with at least one of said tanks, said heating unit being mounted so that a wall of said casing is adjacent but in spaced relation to said reentrant portion.

4. In a device of the class described, in combination, a plurality of tanks adapted to contain liquid, one of said tanks having a reentrant portion and being mounted within another of said tanks and with its bottom adjacent but in spaced relation to the bottom of the latter, and a heating unit mounted in thermal association with one of said tanks, said heating unit comprising a portion which is thermally associated with said reentrant portion.

5. In a device of the class described, in combination, a plurality of tanks adapted to contain liquid, one of said tanks being disposed within another of said tanks in spaced relation thereto, the last named tank being provided with a reentrant portion having an opening, and a heating unit associated with one of said tanks and comprising a thermal well, the outlet of said well being adjacent but in spaced relation to the opening in said reentrant portion.

6. In a device of the class described, in combination, a tank adapted to contain a liquid and provided with an opening in a lower portion thereof and a heating unit provided with a thermal well, said heating unit being mounted adjacent but in spaced relation to the said lower portion of said tank and with the outlet of said well in spaced registry with said opening.

7. In a device of the class described, in combination, a plurality of tanks, one of said tanks being mounted with a portion thereof adjacent and in spaced relation to a portion of another of said tanks, and a heating unit provided with a thermal well, the spaced relationship of said tank portions providing a passageway between such portions for the flow of liquid from one of said tanks to said well.

8. In a device of the class described, in combination, an electrical heating unit having a thermal well for liquid to be heated, a thermal plug having a portion comprising the bottom portion of said well, and means having an instrumentality thermally associated with said plug and adapted to render said heating unit substantially inactive upon the temperature of said instrumentality reaching a predetermined point.

9. In apparatus of the class described, in combination, an electrical heating unit having a thermal well for liquid to be heated, a thermal plug associated with said well and having a portion adapted to be directly contacted by liquid in the well, and a device thermally associated with said plug and adapted when the temperature of a part thereof reaches a pre-determined point to render said heating unit substantially ineffective.

10. In a device of the class described, in combination, a pair of tanks, one of said tanks being disposed within the other, a member connected in liquid-tight association with the inner tank and having a passageway, the ends of which respectively open interiorly and exteriorly of such inner tank, an element connected in liquid-tight association with the outer tank and provided with a plurality of communicating openings, one of said openings being adapted for the reception of a portion of said member with the same in liquid-tight association with the wall of such opening and with the exterior end of the said passageway in registry with another of the openings in said element, and means for securing said member and element in such association.

11. In a device of the class described, in combination, a pair of tanks, one of said tanks being disposed within the other, an element connected in liquid-tight association with the outer tank and having a tapered opening one end of which opens into said outer tank, said element also having a passageway terminating at one end in the outer surface of such element and communicating with said opening, a tapered member connected in liquid-tight association with the inner tank and adapted to engage within the tapered opening in said element in liquid-tight association with the wall thereof, said member having a passageway one end of which opens into the inner tank and the other end of which communicates with the passageway in said element, and means for securing said element and member in such association.

12. In a device of the class described, in combination, a pair of tanks adapted to contain liquid, one of said tanks being disposed within the other, and means for withdrawing liquid from the inner tank to a point external of the outer tank comprising two cooperating members, each of said members having a passageway, said passageways being in communication with each other and respectively terminating within said inner tank and externally of said outer tank.

13. In a device of the class described, in combination, a pair of tanks, said tanks being disposed one within the other with their bottoms in spaced relation, and means for securing said tanks in such association comprising a plurality of cooperating members, one of said members being connected in liquid-tight association with the inner tank and one of said members being connected in liquid-tight association with the outer tank.

14. In a device of the class described, in combination, a receptacle for liquid, a basket for comminuted material associated with said receptacle, a tubular member connected in liquid-tight association with said receptacle and extending through an opening in the bottom thereof to a point above the latter, said tubular member having a notch in the upper end thereof, a hollow element associated with said basket and adapted to telescope over said tubular member with an upper portion thereof in association with the upper end of the tubular member, said element having an interior configuration which differs from the exterior configuration of said tubular member, so that when such element is telescoped over the tubular member the inner surface of the element coacts with the outer surface of the tubular member to form a longitudinally extending channel one end of which is in communication with said notch and a tube which differs in exterior configuration from the interior configuration of said tubular member, said tube being disposed within said tubular member with the outer surface thereof coacting with the inner surface of the tubular member to form a longitudinally extending channel one end of which is also in communication with said notch.

15. In a device of the class described, in combination, a tank, a receptacle for liquid supported in association with said tank, a perforated basket adapted to contain comminuted material supported in association with said receptacle, a tube extending upwardly from a bottom portion of said tank, a tubular member associated with said receptacle, a hollow element associated with said basket, said tube extending through said member and said element and being adapted to discharge liquid into said basket, and means adapted to siphon liquid from said receptacle to said tank upon the liquid reaching a predetermined height in the receptacle, said means comprising communicating channels, one of said channels being formed by the coaction of the inner surface of said element with the outer surface of said tubular member and one of said channels being formed by the coaction of the inner surface of said tubular member with the outer surface of said tube.

16. In a device of the class described, in combination, a receptacle for liquid, a basket for comminuted material associated with said receptacle so that liquid which passes through the basket will enter the same, and means associated with said receptacle for effecting the removal of substantially all of the liquid from the receptacle upon the liquid reaching a predetermined level therein, said means comprising cooperating vertically extending hollow members, one of which members has an upper end portion thereof notched to thereby establish communication between such member and another of the hollow members.

17. In a device of the class described, in combination, a receptacle for liquid, a basket for comminuted material associated with said receptacle so that liquid which passes through the basket will enter the same, and means for effecting the removal of a substantial part of the liquid from said receptacle upon the liquid reaching a predetermined level therein, said means comprising three cooperating vertically extending hollow members, said members being nested so that there is an inner, an outer and an intermediate member, said three members being of such respective cross-sectional areas and configurations that portions of the outer and inner surfaces of the intermediate member respectively so engage portions of the inner and outer surfaces of the outer and inner members as to form a plurality of pairs of communicating channels, each of said pairs of channels constituting a siphon.

18. In an infusion device, in combination, a tank adapted to contain a liquid, a second tank disposed within said first tank, a basket adapted to hold comminuted material and to permit a liquid to pass therethrough, and a vessel mounted in association with said second tank, said vessel being so disposed in respect to said basket that liquid passing through said basket will be received by said vessel in intimate association with said basket, and means for withdrawing liquid from said vessel.

19. In an infusion device, in combination, a tank adapted to contain a liquid, a second tank disposed within said first tank, a basket adapted to hold comminuted material and to permit the liquid to pass therethrough, means for introducing a liquid from said first tank into said basket, and a vessel mounted in association with said second tank, said basket and vessel being relatively disposed so that liquid passing through the basket will be received by the vessel in intimate association with the basket, said vessel being provided with an opening through which a liquid may pass therefrom.

CLAUDE T. JOHNSON.